Feb. 1, 1955 W. F. SMITHERS 2,701,153
STRUCTURAL STEEL JOINT
Filed Dec. 8, 1952

Wayne F. Smithers
INVENTOR.

BY *Clarence A. O'Brien*
*and Harvey B. Jacobson*
Attorneys

United States Patent Office 2,701,153
Patented Feb. 1, 1955

2,701,153

STRUCTURAL STEEL JOINT

Wayne F. Smithers, Perrysburg, Ohio

Application December 8, 1952, Serial No. 324,785

1 Claim. (Cl. 287—104)

This invention relates to new and useful improvements in metallic joints and the primary object of the present invention is to provide a device whereby the adjacent ends of two tubular members may be engaged with each other for the purpose of producing scaffold sections, ladder sections, or the like.

Another important object of the present invention is to provide a coupling means between tubular members involving a pair of complemental bar members which are removably secured within the adjacent ends of two tubular members to slidably engage each other as the tubular members are engaged one with the other.

A further object of the present invention is to provide a steel joint of the aforementioned character wherein the bar members are provided with convex walls which are secured against the inner periphery of a tubular member to reinforce and strengthen the end of the tubular member as the two bar members are engaged with each other during assembling of the tubular members.

A still further aim of the present invention is to provide a metallic joint that is extremely simple and practical in construction, strong and reliable in use, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
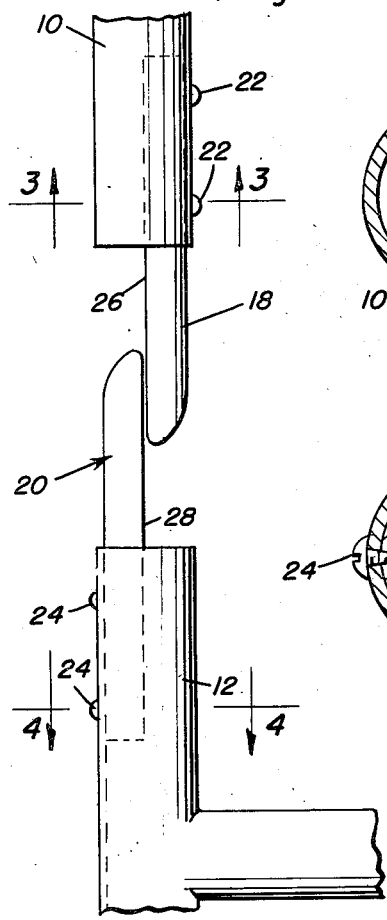
Figure 1 is a fragmentary elevational view showing two ladder sections spaced apart and having the means secured thereto for coupling the sections together.
Figure 3:
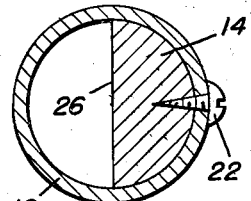
Figure 3 is a transverse horizontal sectional view, in slightly larger scale, on the plane of section line 3—3 of Figure 1.
Figure 2:
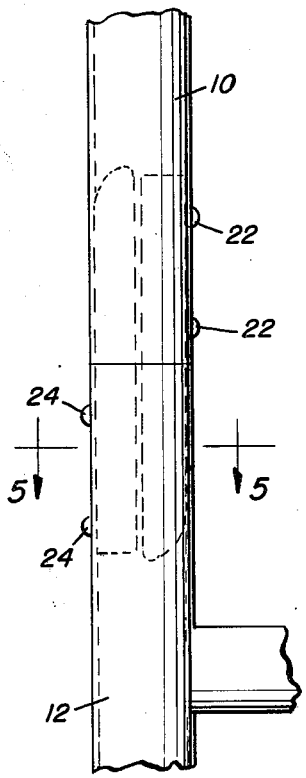
Figure 2 is a view similar to Figure 1 but showing the two sections engaged.
Figure 4:
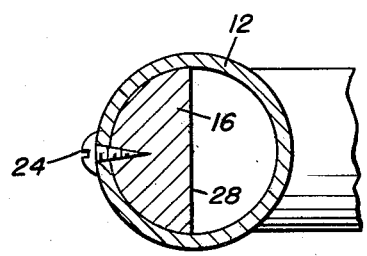
Figure 4 is an enlarged transverse horizontal sectional view taken substantially on the plane of section line 4—4 of Figure 1.

Referring now to the drawings in detail, wherein for the purpose of illustration, there is disclosed a preferred embodiment of the present invention, the numerals 10 and 12 represent a pair of tubular sections that are detachably joined together to form a supporting post, ladder rail, scaffold or the like. The inner end portions 14 and 16 of a pair of semi-cylindrical bars or bar members 18 and 20 are removably fixed within the adjacent ends of the sections 10 and 12 respectively by fasteners 22 and 24.

The bars 18 and 20 have a radius equal to one half the internal diameter of the sections 10 and 12. The convex surfaces of bars 18 and 20 are engaged against the inner peripheries of the sections 10 and 12 and are held thereagainst by the fasteners 22 and 24.

The outer end of the bar 18 is slipped into the section 12 as the outer end of the bar 20 is slipped into the section 10. The bars 18 and 20 are disposed in side-by-side relation and the flat longitudinal faces 26 and 28 of the bars 18 and 20 contact each other to prevent rotation of the sections 10 and 12 relative to each other.

Figure 6:
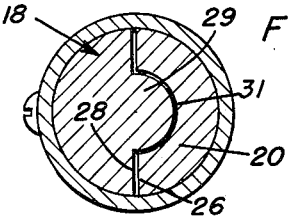
Figure 6 is a view similar to Figure 5 but showing the bar elements in modified form.
Figure 5:
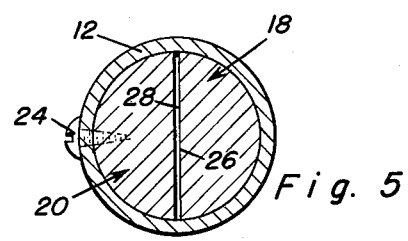
Figure 5 is an enlarged transverse horizontal sectional view taken substantially on the plane of section line 5—5 of Figure 2.

Figure 6 shows the bars 18 and 20 in slightly modified form. In this embodiment, the bar 18a is provided with a half round longitudinal rib 29 on its flat longitudinal face 28a that enters a semi-cylindrical groove 31 in the flat longitudinal face 26a of bar 20a.

Figure 7:
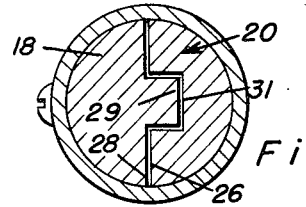
Figure 7 is a view similar to Figures 5 and 6 but showing the bar elements in a further modified form; and, Figure 8 is a view similar to Figures 5, 6, and 7, but showing the bar elements in additionally modified form.

Figure 7 shows the bar 18b has a square longitudinal rib 29a formed on its flat vertical face 28b that enters a similarly shaped slot 31a in the flat longitudinal face 26b of the bar 20b.

Figure 8:
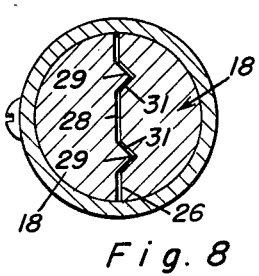

Figure 8 illustrates the flat longitudinal face 28c of the bar 18c formed with a pair of spaced parallel V-shaped ribs 29b that enter the V-shaped longitudinal grooves 31b in the flat longitudinal face 26c of the bar 18c.

The invention thus disclosed is adaptable for use in conjunction with tubular sections which may comprise sections of a supporting post, scaffold or the rails of a ladder. The sections 10 and 12 are engaged as the outwardly extending end of the bar carried by one section slipped into the other section. The bars will be in engagement with each other throughout their length by their inner flat faces contacting one another and the convex surface of the bars will engage the inner periphery of the tubular member to which they are secured so that the adjacent ends of the tubular members or sections 10 and 12 will be reinforced at their engaged ends. The interconnection between the bars in the form of the ribs and grooves, Figures 6, 7, and 8, will additionally prevent rotation of the sections 10 and 12 relative to each other while retaining the sections in longitudinal alignment.

It is noted that the bar elements 18 and 20 are provided with curved outer end portions that will ride against the end of a tubular member in which they are being inserted to guide the bar elements into a tubular member.

What is claimed as new is as follows:

A structural joint for a first hollow tubular section and a second hollow tubular section superposed on said first section with said first section being in load bearing relationship relative to said second section with adjacent ends of said first and second sections being in abutting relationship, a first semi-cylindrical bar, means detachably securing the lower end of said first bar entirely within said first section with the upper end of said first bar being entirely received in said second section, a second semi-cylindrical bar, means detachably securing the upper end of said second bar entirely within said second section with the lower end of said second bar being entirely received in said second section, said bars engaging each other substantially throughout the length of said bars, said first bar having a recess therein, said second section having a tongue thereon, said tongue being seated in said recess interlocking said first and second sections.

References Cited in the file of this patent

UNITED STATES PATENTS

| 904,603 | Crocker | Nov. 24, 1908 |
| 925,293 | Cheney | June 15, 1909 |
| 1,641,627 | Ericson | Sept. 6, 1927 |
| 1,972,653 | Hart | Sept. 4, 1934 |
| 2,490,316 | Ostrak | Dec. 6, 1949 |

FOREIGN PATENTS

| 10,330 | Great Britain | of 1913 |
| 611,970 | Germany | Dec. 24, 1933 |